United States Patent
Uchida et al.

(10) Patent No.: US 6,958,985 B1
(45) Date of Patent: Oct. 25, 2005

(54) MOBILE COMMUNICATION SYSTEM

(75) Inventors: Yoshinori Uchida, Tokyo (JP); Shinji Matsumoto, Tokyo (JP)

(73) Assignee: Mitsubishi Denki Kabushiki Kaisha, (JP)

( * ) Notice: Subject to any disclaimer, the term of this patent is extended or adjusted under 35 U.S.C. 154(b) by 727 days.

(21) Appl. No.: 09/688,814

(22) Filed: Oct. 17, 2000

Related U.S. Application Data

(63) Continuation of application No. PCT/JP99/01295, filed on Mar. 16, 1999.

(51) Int. Cl.$^7$ .............................................. H04J 3/00
(52) U.S. Cl. ...................................... 370/336; 370/376
(58) Field of Search ................................ 370/280, 281, 370/294, 310, 319–321, 326, 347, 329, 330, 370/336, 337, 348, 431, 441–443, 458, 328, 370/345, 375, 376, 459, 465, 468

(56) References Cited

U.S. PATENT DOCUMENTS

| | | | |
|---|---|---|---|
| 5,150,362 A * | 9/1992 | Akerberg | 370/331 |
| 5,535,207 A | 7/1996 | Dupont | |
| 5,598,417 A | 1/1997 | Crisler et al. | |
| 5,701,294 A * | 12/1997 | Ward et al. | 370/252 |
| 5,719,859 A * | 2/1998 | Kobayashi et al. | 370/347 |
| 5,729,541 A * | 3/1998 | Hamalainen et al. | 370/337 |
| 5,805,581 A | 9/1998 | Uchida et al. | |
| 5,896,561 A * | 4/1999 | Schrader et al. | 455/67.11 |
| 6,044,067 A * | 3/2000 | Suzuki | 370/252 |
| 6,272,325 B1 * | 8/2001 | Wiedeman et al. | 455/117 |
| 6,377,800 B1 * | 4/2002 | Cho | 455/426.2 |
| 6,574,211 B2 * | 6/2003 | Padovani et al. | 370/347 |
| 6,590,878 B1 * | 7/2003 | Uchida et al. | 370/330 |
| 6,603,747 B2 * | 8/2003 | Asai | 370/322 |

FOREIGN PATENT DOCUMENTS

| | | | | |
|---|---|---|---|---|
| EP | 0 782 297 A2 | 7/1997 | | |
| JP | 653875 | 2/1994 | | |
| JP | H06-53875 | * 2/1994 | | H04B 7/212 |
| JP | 7336774 | 12/1995 | | |

* cited by examiner

*Primary Examiner*—Kwang Bin Yao
(74) *Attorney, Agent, or Firm*—Rothwell, Figg, Ernst & Manbeck, PC

(57) ABSTRACT

In a mobile communication system, a subscriber station MS11 changes the time slot for receiving a frame from a base station 1 in accordance with TS change information sent from the base station, while the base station 1 changes the time slot for receiving a frame from the subscriber station MS11 in accordance with TS change information sent from the subscriber station.

21 Claims, 13 Drawing Sheets

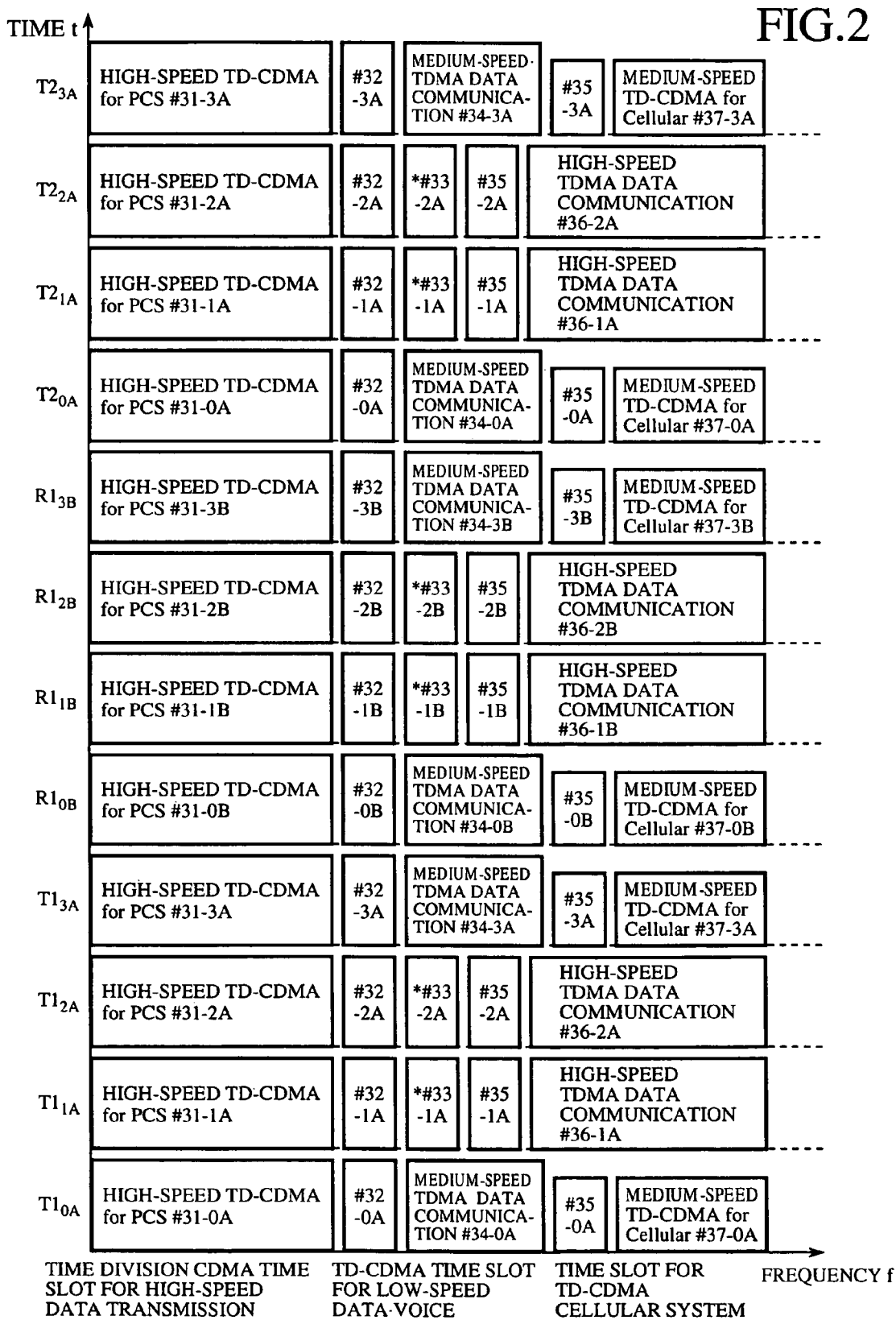

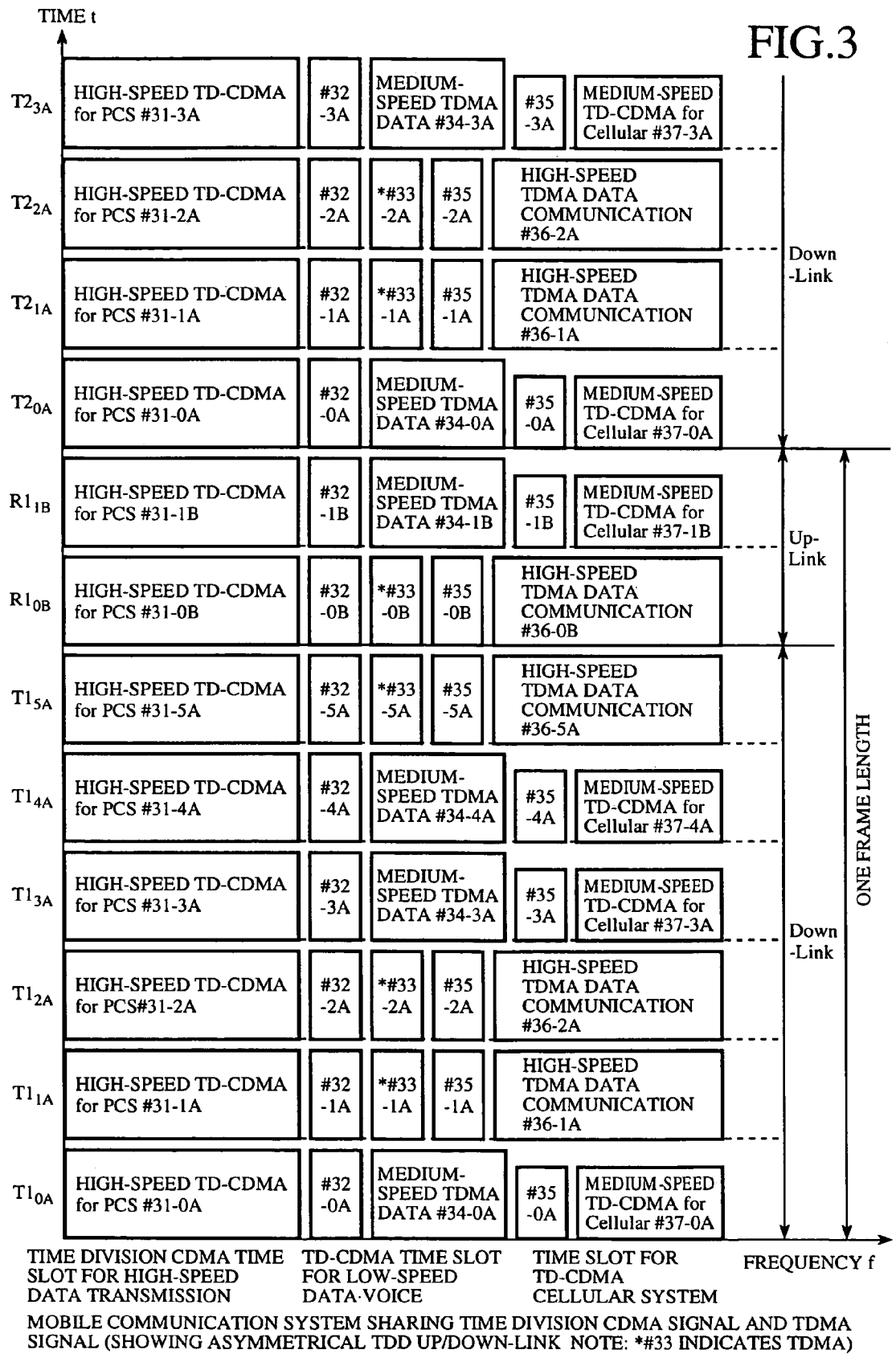

FIG.4

EXAMPLES OF MOBILE STATION SWITCHING
TIME-USABLE TRANSMISSION RATES

| NO. | MOBILE STATION NO. | SWITCHING TIME (ms) | USABLE DATA TRANSMISSION RATE (kbps) |
|---|---|---|---|
| MS11 | 19980428 | 0.1 | UP: INTERMITTENT 1,2,4,8,32,1024<br>DOWN: INTERMITTENT 1,2,4,8,32,1024,2048 |
| MS12 | 19980429 | 0.2 | UP: INTERMITTENT 1,2,32,1024<br>DOWN: INTERMITTENT 1,2,32,1024,4096 |
| MA13 | 19980501 | 0.1 | UP: INTERMITTENT 1,2,4,8,32<br>DOWN: INTERMITTENT 1,2,4,8,32,1024 |
| MA14 | 19980503 | 10.0 | UP: INTERMITTENT 1,2,8<br>DOWN: INTERMITTENT 1,2,4,8,32,1024,4096 |
| WS21 | 19980601 | 0.2 | UP: INTERMITTENT 1,2,32,1024<br>DOWN: INTERMITTENT 1,2,32,1024,4096 |
| WS22 | 19980605 | 5.0 | UP: INTERMITTENT 1,2,4,8,32,4096<br>DOWN: INTERMITTENT 1,2,4,8,32,1024 |
| WS23 | 19980614 | 0.1 | UP: INTERMITTENT 1,2,4,8,32,1024<br>DOWN: INTERMITTENT 1,2,4,8,32,1024,2048 |

(EXAMPLE OF MOBILE STATION INFORMATION MEMORY IN MSC)

FIG.5

ASSIGNMENT OF PLURAL CHANNELS AND
STATE-OF-USE DISPLAY MEMORY

| MOBILE STATION NO. | SWITCHING TIME (ms) | Up-Link/ Down-Link | 1ST CHANNEL USE/NONUSE | 2ND CHANNEL USE/NONUSE | 3RD CHANNEL USE/NONUSE | 4TH CHANNEL USE/NONUSE |
|---|---|---|---|---|---|---|
| 19980428 (MS11) | 0.1 | Up | INTERMITTENT #35-0B | <u>1kbps #32-0B</u> | 8kbps #32-3B | 1024kbps #31-0B |
| | | Down | INTERMITTENT #35-0A | 2kbps #32-1A | 32kbps #37-0A | <u>2048kbps #31-1A</u> |
| 19980429 (MS12) | 0.2 | Up | <u>INTERMITTENT #35-0B</u> | 1kbps #32-0B | 32kbps #37-0B | 1024kbps #31-0B |
| | | Down | INTERMITTENT #35-0A | 4kbps #32-2A | 32kbps #37-0A | 4096kbps #31-2A |
| 19980501 (MS13) | 0.1 | Up | INTERMITTENT #35-0B | 1kbps #32-0B | <u>32kbps #37-0B</u> | |
| | | Down | INTERMITTENT #35-0A | 1kbps #32-0A | 32kbps #37-0A | 1024kbps #31-0A |
| 19980503 (MS14) | 10.0 | Up | <u>INTERMITTENT #35-0B</u> | 1kbps #32-0B | 8kbps #32-3B | |
| | | Down | INTERMITTENT #35-0A | 1kbps #32-0A | <u>8kbps #32-3A</u> | 1024kbps #31-0A |
| 19980601 (WS21) | 0.2 | Up | INTERMITTENT #35-0B | 1kbps #32-0B | 32kbps #37-0B | <u>1024kbps #31-0B</u> |
| | | Down | INTERMITTENT #35-0A | <u>4kbps #32-2A</u> | 32kbps #37-0A | 4096kbps #31-2A |
| 19980605 (WS22) | 5.0 | Up | INTERMITTENT #35-0B | 1kbps #32-0B | 32kbps #37-0B | <u>4096kbps #31-2B</u> |
| | | Down | INTERMITTENT #35-0A | <u>1kbps #32-0A</u> | 32kbps #37-0A | 1024kbps #31-0A |
| 19980614 (WS23) | 0.1 | Up | INTERMITTENT #35-0B | 1kbps #32-0B | 32kbps #37-0B | <u>1024kbps #31-0B</u> |
| | | Down | INTERMITTENT #35-0A | <u>2kbps #32-1A</u> | 32kbps #37-0A | 2048kbps #31-1A |

NOTE: UNDERLINED CHANNELS ARE CURRENTLY IN USE.

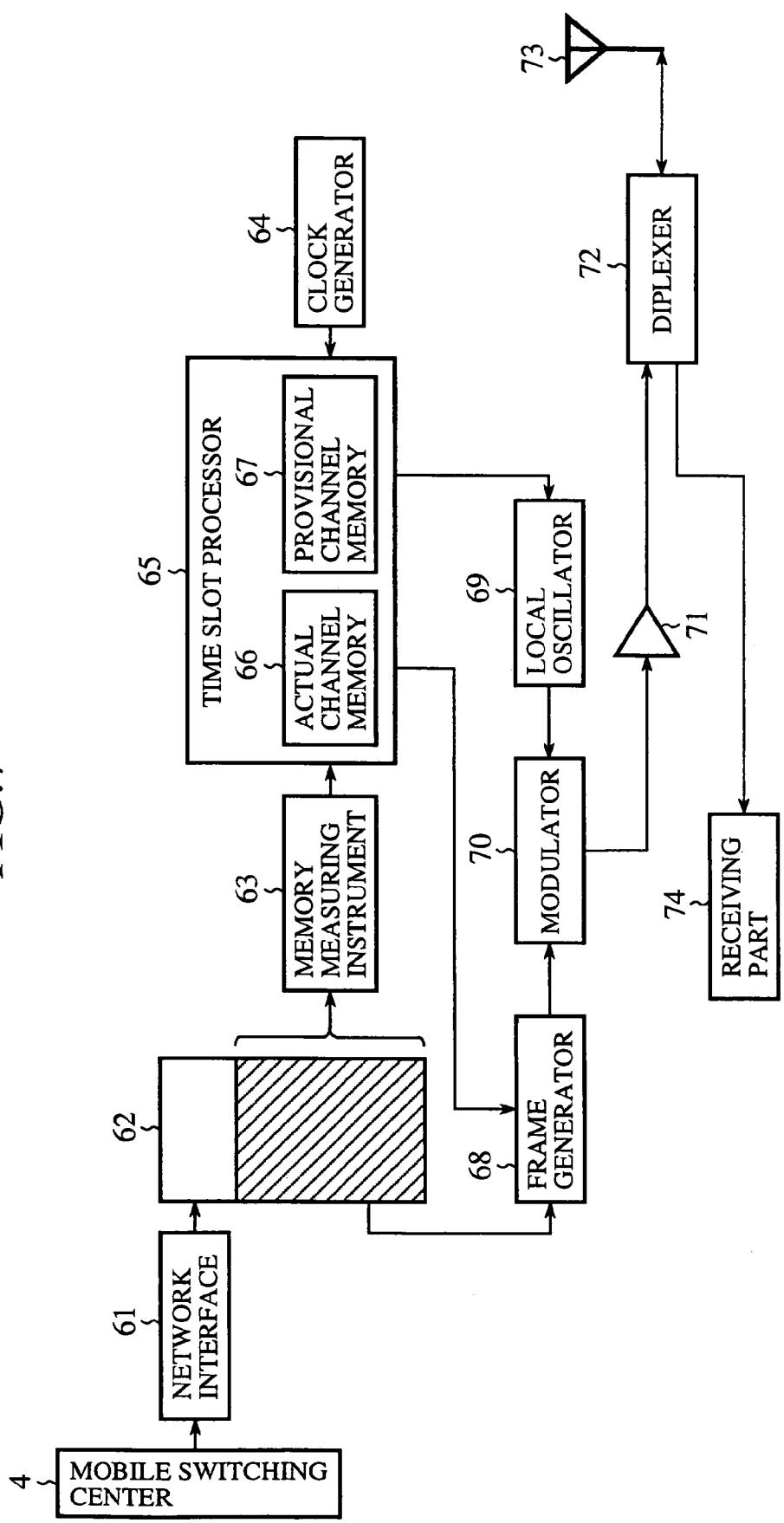

FIG.9

CHANNEL ASSIGNMENT BEFORE ACTUAL USE

| MOBILE STATION NO. | SWITCHING TIME (ms) | Up-Link/Down-Link | 1ST CHANNEL USE/NONUSE | 2ND CHANNEL USE/NONUSE | 3RD CHANNEL USE/NONUSE | 4TH CHANNEL USE/NONUSE |
|---|---|---|---|---|---|---|
| 19980428 (MS11) | 0.1 | Up | INTERMITTENT #35-0B | 1kbps <u>#32-0B</u> | 8kbps #32-3B | 1024kbps #31-0B |
|  |  | Down | INTERMITTENT #35-0A | 2kbps #32-1A | 32kbps <u>#37-0A</u> | 2048kbps #31-1A |
| 19980429 (MS12) | 0.2 | Up | <u>INTERMITTENT #35-0B</u> | 1kbps #32-0B | 32kbps #37-0B | 1024kbps #31-0B |
|  |  | Down | <u>INTERMITTENT #35-0A</u> | 4kbps #32-2A | 32kbps #37-0A | 4096kbps #31-2A |

NOTE 1: UNDERLINED CHANNELS ARE CURRENTLY IN USE.
NOTE 2: BOLDFACED CHANNEL (#37-0A OF MS12) CANNOT BE USED BECAUSE MS11 HAS ACTUALLY ASSIGNED THE SAME SLOT.

FIG.10

CHANNEL ASSIGNMENT BEFORE ACTUAL USE

| MOBILE STATION NO. | SWITCHING TIME (ms) | Up-Link/ Down-Link | 1ST CHANNEL USE/NONUSE | 2ND CHANNEL USE/NONUSE | 3RD CHANNEL USE/NONUSE | 4TH CHANNEL USE/NONUSE |
|---|---|---|---|---|---|---|
| 19980428 (MS11) | 0.1 | Up | INTERMITTENT #35-0B | 1kbps #32-0B | 8kbps #32-3B | 1024kbps #31-0B |
| | | Down | INTERMITTENT #35-0A | 2kbps #32-1A | 32kbps #37-0A | 2048kbps #31-1A |
| 19980429 (MS12) | 0.2 | Up | INTERMITTENT #35-0B | 1kbps #32-0B | 32kbps #37-0B | 1024kbps #31-0B |
| | | Down | INTERMITTENT #35-0A | 4kbps #32-2A | 32kbps #37-3A | 4096kbps #31-2A |

NOTE 1: UNDERLINED CHANNELS ARE CURRENTLY IN USE.
NOTE 2: SINCE MS11 HAS ACTUALLY ASSIGNED #37-0A, MS12 IS ASSIGNED ANOTHER SLOT (#37-3A).

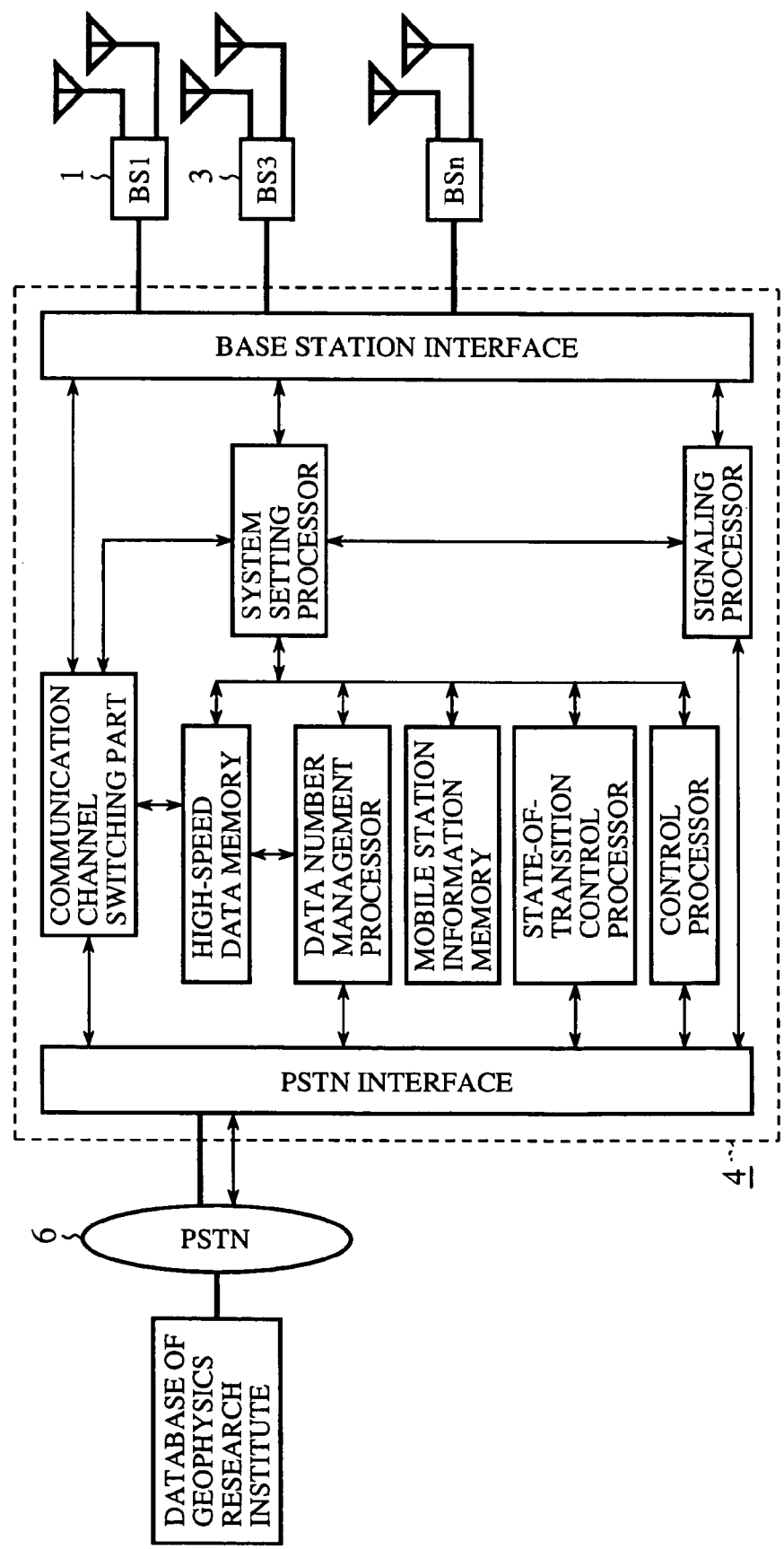

MOBILE COMMUNICATION SYSTEM

CROSS-REFERENCE TO THE RELATED APPLICATION

This application is a continuation of International Application No. PCT/JP99/01295, whose International filing date is Mar. 16, 1999, the disclosures of which Application are incorporated by reference herein.

BACKGROUND OF THE INVENTION

1. Field of the Invention

The present invention relates to a mobile communication system which permits independent setting of the transmission rates of up- and down-links.

2. Description of the Related Art

Mobile communication systems have a structure in which subscriber stations, i.e. mobile stations (such as vehicle-installed communication devices and portable communication devices) are connected to a base station via radio channels.

In these mobile communication systems, there is the possibility that sharing of radio frequency spectra (hereinafter referred to as "frequency sharing") by different radio systems is implemented by an FDMA/TDMA combination, while in the CDMA system frequency sharing between different codes or symbols has already been put into practice. Handover in these systems is already known.

For example, time slot sharing mobile communication system which shares a TDMA signal and a time division CDMA signal in the same time slot is disclosed in our U.S. Pat. No. 5,805,581' (Japanese Pat. Appln. Laid-Open Gazette No. 8-130766, EP701337A).

For instance, in the case of building a multimedia in such a mobile communication system as mentioned above, it is necessary that the channel capacity of an up-link over which the subscriber station sends data to the base station and the channel capacity of a down-link over which the base station sends data to the subscriber station be set independently of each other. Moreover, to cope with variations in the amount of data sent during communication, it is necessary to establish a system which enables the data transmission rate to be changed accordingly.

For example, upon occurrence of a situation in which a momentary increase takes place in the amount of data to be sent from the subscriber station to the base station, the subscriber station computes the transmission rate required taking into consideration the amount of increase in the data to be sent, and sends a request for a change of the transmission rate to the base station.

Upon receiving the request for a change of the transmission rate from the subscriber station, the base station determines whether a change of the transmission rate can be accepted after hunting for an idle channel in the link over which they are currently in communication with each other.

And, when judging that a change of the transmission rate can be accepted, the base station sends to the subscriber station the identification number of the communication channel to be used thereafter.

Upon receiving from the base station the identification number of the communication channel for subsequent use from the base station, the subscriber station sends data over the designated communication channel to the base station after that.

In this way, the data transmission rate is changed, but since the actual change of the data transmission rate calls for a process of obtaining permission from the distant or remote station, there is a need to allow for a considerable amount of waiting time until the transmission rate is actually changed after the amount of data to be sent changes.

Accordingly, in a mobile communication system in which the amount of data sent undergoes great variations and allowance for an appreciable amount of waiting time is difficult to make, it is customary to adopt a scheme which fixes the transmission rate at a large value by assigning a wide frequency band from the beginning of communication.

Since the conventional mobile communication system has such a configuration as mentioned above, the transmission rate can be changed when permission is obtained from the distant station after sending thereto a request for a change of the transmission rate, but a considerable amount of time is needed until the transmission rate is actually changed. Hence, when the amount of data to be sent varies greatly, congestion of data or the like occurs, leading to, for example, impairment of the immediacy of data sent in real time.

SUMMARY OF THE INVENTION

It is therefore an object of the present invention to provide a mobile communication system which enables the data transmission rate to be changed quickly during communication.

According to an aspect of the present invention, time slot changing means of the subscriber station changes the time slot in which to receive data from the base station in accordance with time slot change information sent from change request means of the base station.

This enables the base station to use the new time slot for sending the next and subsequent frames, making it possible to ensure the immediacy of data sent in real time even when the amount of data to be sent varies greatly.

According to another aspect of the present invention, when the change request means of the base station sends time slot change information to the subscriber station, the base station uses the new time slot to send data contained in the next and subsequent frames.

This ensures the immediacy of data sent in real time even when the amount of data to be sent varies greatly.

According to another aspect of the present invention, the transmission rate is determined in accordance with an instantaneous amount of data to be sent to the subscriber station.

This permits determination of an appropriate transmission rate according to the amount of data to be sent.

According to another aspect of the present invention, an instantaneous amount of data to be sent is detected from that amount of data received from a switching center which has yet to be sent to the subscriber station.

This allows ease in detecting the instantaneous amount of data to be sent without using any complicated arrangement.

According to another aspect of the present invention, information for a change of the time slot to be used for sending the next frame is read out of a provisional channel memory provisionally pre-assigned the time slot, and the read-out information is sent to the subscriber station.

This permits quick switching of the time slot.

According to another aspect of the present invention, reservation information indicating the timing for changing the time slot is sent to the subscriber station together with the time slot change information.

This makes it possible for the subscriber station to prepare a time slot changing process in anticipation of a variation in the amount of data to be sent and hence perform the time slot changing process in good time, enabling congestion or the like in the frequency band concerned to be judged.

According to another aspect of the present invention, the subscriber station determines the time slot change timing in accordance with the reservation information sent from the base station.

This enables the subscriber station to prepare the time slot changing process in anticipation of a variation in the amount of data to be sent.

According to another aspect of the present invention, when a desired time slot becomes unusable before time slot changing means of the subscriber station changes the current to the new time slot after having received the time slot change information and the reservation information from the base station, the change request means of the base station sends to the subscriber station time slot change information indicating another time slot.

This makes it possible to secure the required transmission rate even if the initially-designated time slot becomes unusable.

According to another aspect of the present invention, when receiving the time slot change information indicating another time slot from change request means of the base station, the time slot changing means of the subscriber station changes the time slot for receiving data from the base station in accordance with the time slot change information.

This makes it possible to secure the required transmission rate even if the initially-designated time slot becomes unusable.

According to another aspect of the present invention, in the case of increasing the data transmission rate, it is determined whether to change the transmission rate by referring to the sendable power of a transmitter in the base station.

This prevents cutting of radio connection by switching of the time slot.

According to another aspect of the present invention, in the case of decreasing the data transmission rate, it is determined whether to change the transmission rate by referring to the sensitivity of a receiver in the subscriber station and the sendable power of a transmitter in the base station.

This also prevents cutting of radio connection by switching of the time slot.

According to another aspect of the present invention, time slot changing means of the base station changes the time slot in which to receive data from the subscriber station in accordance with time slot change information sent from change request means of the subscriber station.

This enables the subscriber station to use the new time slot for sending the next and subsequent frames, making it possible to ensure the immediacy of data sent in real time even when the amount of data to be sent varies greatly. According to another aspect of the present invention, when the change request means of the subscriber station sends time slot change information to the base station, the subscriber station uses the new time slot to send data contained in the next and subsequent frames.

This ensures the immediacy of data sent in real time even when the amount of data to be sent varies greatly.

According to another aspect of the present invention, the transmission rate is determined in accordance with an instantaneous amount of data to be sent to the base station.

This permits determination of an appropriate transmission rate according to the amount of data to be sent.

According to another aspect of the present invention, an instantaneous amount of data to be sent is detected from that amount of data received from a man-machine interface which has yet to be sent to the base station.

This allows ease in detecting the instantaneous amount of data to be sent without using any complicated arrangement.

According to another aspect of the present invention, information for a change of the time slot to be used for sending the next frame from the subscriber station is read out of a provisional channel memory provisionally pre-assigned the time slot, and the read-out information is sent to the base station.

This permits quick switching of the time slot.

According to another aspect of the present invention, reservation information indicating the timing for changing the time slot is sent to the base station together with the time slot change information.

This makes it possible for the base station to prepare a time slot changing process in anticipation of a variation in the amount of data to be sent and hence perform the time slot changing process in good time, enabling congestion or the like in the frequency band concerned to be judged.

According to another aspect of the present invention, the base station determines the time slot change timing in accordance with the reservation information sent from the subscriber station.

This enables the base station to prepare the time slot changing process in anticipation of a variation in the amount of data to be sent.

According to another aspect of the present invention, when a desired time slot becomes unusable before time slot changing means of the base station changes the current to the new time slot after having received the time slot change information and the reservation information from the subscriber station, the change request means of the subscriber station sends to the base station time slot change information indicating another time slot.

This makes it possible to secure the required transmission rate even if the initially-designated time slot becomes unusable.

According to another aspect of the present invention, when receiving the time slot change information indicating another time slot from change request means of the subscriber station, the time slot changing means of the base station changes the time slot for receiving data from the subscriber station in accordance with the time slot change information.

This makes it possible to secure the required transmission rate even if the initially-designated time slot becomes unusable.

According to another aspect of the present invention, in the case of increasing the data transmission rate, it is determined whether to change the transmission rate by referring to the sendable power of a transmitter in the base station.

This prevents cutting of radio connection by switching of the time slot.

According to another aspect of the present invention, in the case of decreasing the data transmission rate, it is determined whether to change the transmission rate by referring to the sensitivity of a receiver in the subscriber station and the sendable power of a transmitter in the base station.

This also prevents cutting of radio connection by switching of the time slot.

BRIEF DESCRIPTION OF THE DRAWINGS

Other objects, features and advantages of the present invention will become more apparent from the following description taken in conjunction with the accompanying drawings, in which:

FIG. 2 is an explanatory diagram depicting examples of TDMA and time division CDMA time slots for PCS and cellular system use;

FIG. 3 is an explanatory diagram depicting other examples of TDMA and time division CDMA time slots for PCS and cellular system use;

FIG. 4 is an explanatory diagram depicting examples of transmission rates of up- and down-links of a radio communication channel between a subscriber station and a base station;

FIG. 5 is an explanation diagram showing a list of channels provisionally pre-assigned time slots to be used to transmit the next frame in the usable data transmission rates shown in FIG. 4;

FIG. 7 is a block diagram illustrating the inside (change request means) of a base station in the mobile communication system according to Embodiment 1 of the present invention;

FIG. 9 is an explanatory diagram depicting time slots provisionally assigned to respective channels and actual time slots of the respective channels;

FIG. 10 is an explanatory diagram showing the state in which when one of the times slots provisionally assigned to the respective channels is actually used, a new time slot is assigned to that time slot;

FIG. 16 is a block diagram depicting the inside of a mobile switching center.

DETAILED DESCRIPTION OF THE PREFERRED EMBODIMENTS

To describe the present invention in more detail, the best mode for carrying out the invention will be described with reference to the accompanying drawings.

Embodiment 1

Figure 1:
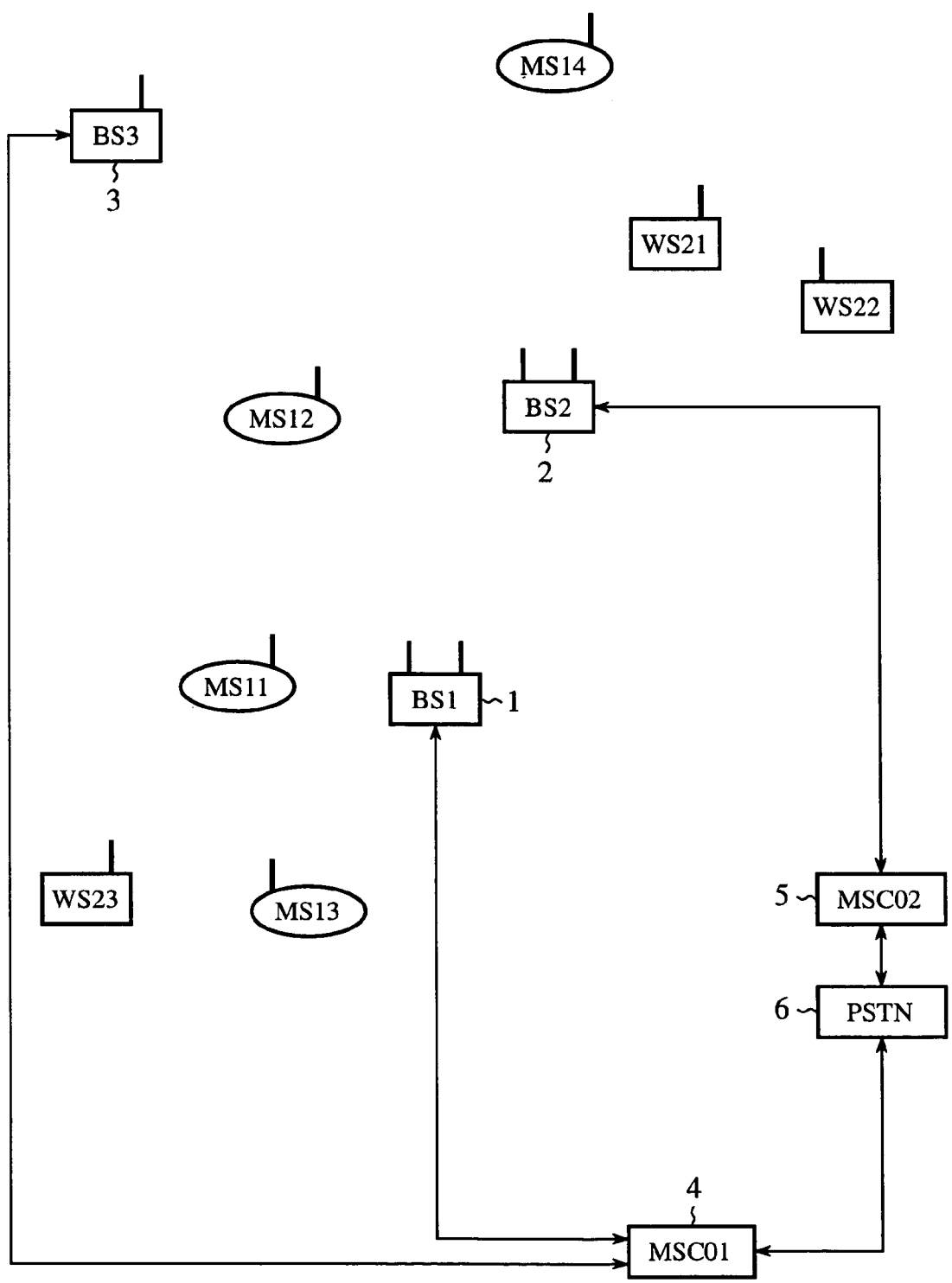
FIG. 1 is a diagram depicting the general outline of a mobile communication system according to a first embodiment of the present invention.

FIG. 1 is a diagram illustrating the general outline of a mobile communication system according to a first embodiment (Embodiment 1) of the present invention. Reference numerals 1 to 3 denote base stations, 4 a mobile switching center for controlling the base stations 1 and 3, 5 a mobile switching center for controlling the base station 2, and 6 PSTN (Public Switching Telephone Network) which is a public system to which the mobile switching centers 4 and 5 are wire-connected.

Reference characters MS11 to MS14 denote mobile stations which are radio-connected to any one of the base stations 1 to 3, such as mobile vehicle-installed communication devices or mobile/portable communication devices, and WS21 to WS23 denote half-fixed or fixed FWA (Fixed Wireless Access) stations which are radio-connected to any one of the base stations 1 to 3.

The mobile stations and the FWA stations carry out radio communications with any one of the base stations 1 to 3 over a low-speed TDMA data channel, a medium-/high-speed TDMA data channel, a time division CDMA channel and so forth, but they have a channel for carrying out voice or low-speed data communication other than the above-mentioned channels. The mobile stations and the FWA stations will hereinafter be collectively called subscriber stations.

While in this embodiment the mobile switching centers 4 and 5 are wire-connected to the PSTN 6, interfaces of the base stations 1 to 3 with the mobile switching centers 4 and 5, the mobile switching centers 4 and 5 and the PSTN 6 have communication capabilities in an ATM (Asynchronous Transfer Mode) as well as in an ordinary communication mode, and they will be described to carry out ATM communications.

Moreover, the subscriber stations MS11 to MS14 and the WS21 to WS23 and the base stations exchange signals through the use of a digital modulation system; let it be assumed that they are radio-linked, for example, by an FDMA/TDD (Time Division Duplex) system which is a frequency division multiple access/time division two-way communication system, CDMA/TDD (Code division Multiple Access/Time Division Duplex) system which is a code division multiple access/time division two-way communication system, TDMA/FDD (Multi-carriers Time division Multiple Access/Frequency Division Duplex) system which is a code division multi-carrier time division/frequency division two-way communication system, TDMA/TDD system, time division CDMA/FDD system, or time division CDMA/TDD system.

FIG. 2 is an explanatory diagram depicting examples of time slots for TDMA and time division CDMA PCS (Personal Communication System) and for a cellular system. In FIG. 2, #31-0A to 3A are time division CDMA time slots for a PCS high-speed data transmission downlink in a first frame, and #31-0B to 3B are time division CDMA time slots for in the first frame. #32-0A to #32-3B are time division CDMA time slots for PCS low-speed data transmission in the first frame; #33-1A to #33-2B and #35-1A to #35-2B are TDMA time slots for PCS low-speed data transmission in the first frame; and #34-0A to #34-3B are TDMA time slots for PCS medium-speed data transmission in the first frame. #36-1A to #35-2B are TDMA time slots for PCS high-speed data transmission in the first frame; #35-0A to #35-3B are TDMA time slots for cellular low-speed data transmission in the first frame; and #37-0A to #37-3B are time division CDMA time slots for cellular high-speed data transmission in the first and second frames.

Incidentally, FIG. 2 shows Up-Link and Down-Link of the TDD (Time Division Duplex) system, the Up-Link being time slots expressed by $R1_{0B}$ to $R1_{3B}$ on the time axis and the Down-Link time slots expressed by $T1_{0A}$ to $T1_{3A}$ and $T2_{0A}$ to T2$_{3A}$ on the time axis. The time slots R1$_{0B}$ to R1$_{3B}$ of UP-Link and the time slots T1$_{0A}$ to T1$_{3A}$ of Down-Link constitute one frame, and time slots T2$_{0A}$ to T2$_{3A}$ are those belonging to the next frame. That is, FIG. 2 expresses one and a half frame.

FIG. 3 is an explanatory diagram showing other examples of TDMA and time division CDMA time slots for PCS and cellular system use; the time slots of the same names as those in FIG. 2 are identical with those in the latter, and hence no description will be repeated.

31-4A to #31-5A are asymmetrical portions of Down-Link in time division CDMA time slots for PCS high-speed data transmission in the first frame, which are time slots to be used when the amount of information to be sent from the base station to the subscriber station is larger than the amount of information to be sent from the subscriber station to the base station. #31-0B to #31-1B are time slots of UP-Link in the first frame. That is, all time slots contained in those T10A to T15A are time slots in the first and other frames which belong to Down-Link. Similarly, all time slots contained in R10B to R11B are time slots in the first and other frames which belong to Up-Link.

FIG. 3 shows the case of an asymmetrical TDD system in which the transmission timing of Up-Link and the transmission timing of Down-Link differ in the TDD frame time length. The present invention is applied not only to such a symmetrical timing TDD system as depicted in FIG. 2 but also to such an asymmetrical TDD system as depicted in FIG. 3; that is, the invention is also applied to the case where the uplink and the downlink of the communication line interconnecting the base station and the subscriber station differ in the amount of data to be sent.

FIG. 4 is an explanatory diagram showing, by way of example, transmission rates of the up- and the down-links for radio communication between subscriber stations and the base station; it is shown that usable transmission rates differ with the kind of multimedia that each subscriber station utilizes.

The transmission rate identified as "intermittent" in FIG. 4 is a transmission rate below 1 kbps, and the "intermittent" transmission rate is used once for multi-frame in the mobile communication system; while the subscriber station is in the course of processing information of its own, no communications are needed between the base station and the subscriber station during this period, but this transmission rate is a low-speed one which is used when the communication line is not off.

FIG. 5 is an explanatory diagram showing a list of channels provisionally pre-assigned time slots for transmission of the next frame and channels which are actually used.

For example, in the case of subscriber station No. 19980428 (MS11), seven kinds of transmission rates from 1 kbps to 24 kbps, including "intermittent," can be set in the uplink (see FIG. 4), but in FIG. 5 four kinds of channels (first to fourth channels) are set as usable channels. That is, FIG. 5 defines the kinds of transmission rates that can be changed during communication.

This setting defines the kinds of communication channels that can be dynamically assigned.

Incidentally, FIG. 5 shows that the time slot #31-0B is currently set in the Up-Link for subscriber stations Nos. 19980601 (WS21) and 19980614 (WS23) to send data therefrom to the base station at the transmission rate 1024 kbps; since this radio wave is TD-CDMA, the same time slot is shared by a plurality of signals in this case. Naturally, spreading codes of the plural radio waves sharing the same time slot are chosen so that they cross at right angles, but in FIG. 5 no information about these codes is shown.

Furthermore, Down-Link of a subscriber station No. 19980428 (MS11) is shown to currently use the fourth channel (the time slot #32-1A with a transmission rate 2048 kbps); for example, when it becomes necessary to switch Down-Link to the second channel (the time slot #32-1A with a transmission rate 2 kbps) to send a small amount of information after completion of sending the large amount of information, the channel is immediately switched at that point in time.

Figure 6:
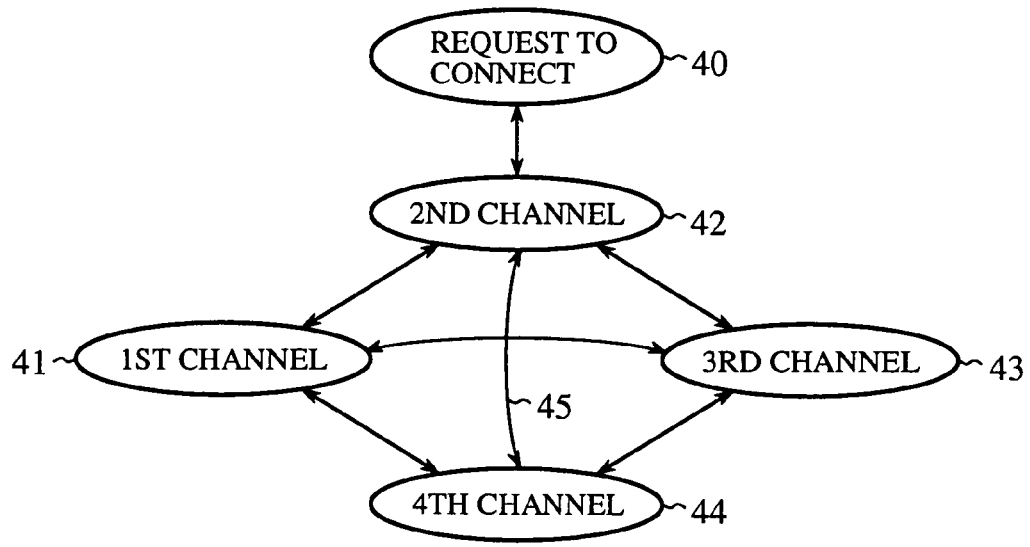
FIG. 6 is a state transition diagram depicting channel switching.

FIG. 6 is a state transition diagram showing channel switching. The state transition diagram shows the state of the downlink or uplink between one subscriber station and one base station. When plural subscriber stations are radio-connected to the base station, the number of state transition diagrams is a multiple of the number of subscriber stations connected. In addition, since the line state differs with each subscriber station, it is needless to say the mobile switching centers 4 and 5 control the base station, taking into consideration the current state of the subscriber stations radio-connected to the base station.

FIG. 7 is a block diagram illustrating the inside (change request means) of the base station of the mobile communication system according to Embodiment 1 of the present invention. Reference numeral 61 denotes a network interface which receives from a mobile switching center 4 ATM information coming from PSTN 6; 62 denotes a FIFO (Fast-in-Fast-out) memory which stores the ATM information received by the network interface 61; 63 denotes a memory measuring instrument which measures the amount of ATM information currently remaining in the FIFO memory 62 (an instantaneous amount of data which has yet to be sent to the subscriber station); and 64 denotes a clock generator which generates a clock.

Reference numeral 65 denotes a time slot processor which performs a selection process of selecting a time slot to be used for the transmission of the next frame in accordance with the amount of ATM information remaining in the memory measured by the memory measuring instrument 63; 66 denotes a real channel memory which stores a channel currently in use; 67 denotes a provisional channel memory provisionally pre-assigned a time slot to be used for the transmission of the next frame; 68 denotes a frame generator which, under instructions from the time slot processor 65, extracts from the FIFO memory 62 the ATM information to be sent to the subscriber station, adds the ATM information with TS change information (change information about he time slot to be used for the transmission of the next frame) and check information, and generates a frame which is sent to the subscriber station; 69 denotes a local oscillator which generates a carrier under instructions from the time slot processor 65; and 70 denotes a modulator by which the frame generated by the frame generator 68 is modulated to the carrier generated by the local oscillator 69.

Reference numeral 71 denotes an amplifier for amplifying the carrier which is output from the modulator 70; 72 denotes a diplexer; 73 denotes an antenna; and 74 denotes a receiving part.

Next, the operation of Embodiment 1 will be described below.

This embodiment will be described in connection with the case of changing the transmission rate when the base station 1 is sending the ATM information to the subscriber station MS11.

In the first place, upon receiving from the mobile switching center 4 (see FIG. 16) the ATM information coming from the PSTN 6, the network interface 61 stores the ATM information in the FIFO memory 62.

In this case, the transmission rate of the ATM information that the network interface 61 is not constant owing to the characteristic of the ATM transmission system. For example, if the transmission rate of the ATM information is made constant which is sent after being read out of the FIFO memory 62, the amount of ATM information remaining in the FIFO memory 62 varies.

In view of the above, the memory measuring instrument 63 measures the amount of ATM information currently remaining in the FIFO memory 62 and outputs the measured amount of information remaining in the memory to the time slot processor 65.

When the amount of ATM information remaining differs from that in the previous frame transmission, the time slot processor 65 outputs a TS change information adding instruction to the frame generator 68 to suppress a change in the amount of information remaining in the FIFO memory 62.

More specifically, letting Z represent the amount of information remaining in the FIFO memory 62, the time slot processor retrieves the following four inequalities for an inequality for which an inequality sign holds, and selects, as the time slot for the next frame transmission over the downlink of the subscriber station, the time slot set in the channel corresponding to the inequality for which an inequality sign holds (see FIG. 5). It is assumed here that the time length of one frame is 10 ms.

(1) $20.48 \text{ kb} \leq Z$
  4th channel (time slot #31-1A of 2048 kbps)
(2) $320 \text{ b} \leq Z < 20.48 \text{ kb}$
  3rd channel (time slot #37-0A of 32 kbps)
(3) $20 \text{ b} \leq Z < 320 \text{ b}$
  2nd channel (time slot #32-1A of 2 kbps)
(4) $Z < 20 \text{ b}$
  1st channel (time slot #35-0A of intermittent transmission rate)

Accordingly, when the amount of information remaining in the FIFO memory 62 exceeds, for instance, 20.48 kb (=2048 kbps×10 ms), the time slot #31-1A of the transmission rate 2048 kbps set in the fourth channel is selected for the next frame transmission.

When the time slot processor 65 selects the time slot for the next frame transmission as described above, it supplies the frame generator 68 with an instruction for adding TS change information indicating the selected time slot and a frame generating instruction (no frame generating instruction being needed when the TS change information adding instruction is used also as the frame generating instruction).

In the case where the amount of ATM information remaining in the memory 62 is not different from that at the time of the previous frame transmission, however, there is no need to change the transmission rate for the next frame. Hence, the time slot processor outputs only the frame generating instruction to the frame generator 68 without outputting thereto the TS change information adding instruction.

Figure 8:
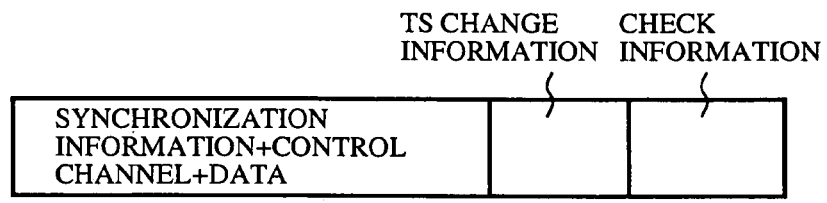
FIG. 8 is a diagram showing a time slot structure in a frame.

And, upon receiving the TS change information adding instruction and the frame generating instruction from the time slot processor 65, the frame generator 68 adds, as depicted in FIG. 8, TS change information and check information (for example, CRC code) to the ATM information read out of the FIFO memory 62 (The amount of ATM information read out of the memory is determined under instructions from the time slot processor 65 but corresponds to the transmission rate of the time slot determined at the time of the previous frame transmission. For example, when the time slot #31-1A of the transmission rate 2048 kbps was selected at the time of previous transmission, ATM information of 20.48 kbps is read out of the FIFO memory 62), thereby forming the frame that is sent to the subscriber station MS11.

Incidentally, when receiving only the frame generating instructions, the frame generator adds the check information to the ATM information to form the frame.

On the other hand, the local oscillator 69 generates a carrier under instructions from the time slot processor 65. That is, the oscillator generates a carrier which corresponds to the transmission rate of the time slot determined at the time of sending the previous frame.

And, when the frame generator 68 provides the frame to be sent this time, the modulator 70 modulates the frame to the carrier generated by the local oscillator 69, and provides the modulated output to the amplifier 71, whose output is sent by radio waves from the antenna 73.

When the radio waves are radiated from the antenna 73 in this way, the subscriber station MS11 receives the radio waves.

And, upon reading out from the radio waves the TS change information forming the frame, time slot change means of the subscriber station MS 11 changes the transmission rate for reception of the next frame, that is, the time slot for reception of the next frame in accordance with the TS change information.

As is evident from the above, since Embodiment 1 has a configuration in which upon receiving the TS change information from the base station 1, the subscriber station MS11 changes the time slot for reception of the frame from the base station 1 in accordance with the TS change information, the base station 1 can use the new time slot to send the next and subsequent frames without having to receive acceptance/rejection information which would otherwise be sent from the subscriber station in reply to the TS change information. Accordingly, even when the amount of ATM information to be sent varies greatly, it is possible to ensure the immediacy of ATM information sent in real time.

Embodiment 2

A description will be given of a second embodiment (Embodiment 2) of the present invention.

In Embodiment 1 described above, at the time of selecting the time slot for the transmission of the next frame in accordance with the amount of ATM information remaining, the time slot processor 65 retrieves an inequality for which an inequality sign holds, and selects the time slot set in the channel corresponding to the inequality. However, it is also possible to employ a configuration in which a time slot is provisionally pre-assigned to each channel as depicted in FIG. 9 and, when it is becomes necessary to change the transmission rate, the channel is used which has been pre-assigned the time slot of the required transmission rate.

That is, when the transmission rate needs to be change, the time slot processor 65 determines the transmission rate for the next frame based on the amount of ATM information remaining. Concretely, if the time length of one frame is 10 ms, the time slot processor multiplies the amount of ATM information remaining by 100 to provisionally determine the transmission rate for the next frame.

For example, when the amount of ATM information remaining is 350 b, the transmission rate for the next frame is provisionally determined to be 35 Kbps.

When having thus provisionally determined the transmission rate for the next frame, the time slot processor 65 refers to the provisional channel memory 67 in which a time slot has been provisionally assigned, and selects the channel corresponding to the provisionally determined transmission rate. For instance, when the transmission rate of the downlink for transmission to the subscriber station MS11 is provisionally determined to be 35 Kbps, the third channel (time slot #37-0A of 32 kbps) is selected.

Upon selection of the channel corresponding to the provisionally determined transmission rate, the time slot processor 65 transfers the channel information to the actual channel memory 66 to perform a process for changing the transmission rate for the next frame and, at the same time, adds the TS change information to the ATM information for transmission to the subscriber station MS11 as in Embodiment 1.

Incidentally, a certain amount of time is needed to update the stored contents of the actual channel memory 66 after a request change of the transmission rate is made. Hence, when the same time slot has been assigned to plural channels (in the case of FIG. 9, the same time slot has been assigned to the third channel of the downlink of the subscriber station MS11 and the third channel of the downlink of the subscriber station MS12), if requests for change of the transmission rate in plural radio channels are made at about the same time, there is a case where the transmission rate in one of the plural radio channels cannot be changed.

For example, if the downlink of the subscriber station MS11 is changed to the third channel (time slot #37-0A of 32 kbps), the downlink of the subscriber station MS12 cannot be changed to the third channel (time slot #37-0A of 32 kbps). Accordingly, as depicted in FIG. 10, that one of currently unused time slots which has a time slot equal to that of the time slot #37-0A (for example, time slot #37-3A) is assigned to the third channel concerned.

In this way, the downlink of the subscriber station MS12 is switched to the third channel (time slot #37-3A of 32 kbps).

Incidentally, according to Embodiment 2, since usable channels have been pre-assigned at the time of changing the time slot, the channel switching can be done at once.

Embodiment 3

A description will be given of a third embodiment (Embodiment 3) of the present invention.

In Embodiment 1 described above, upon receiving the TS change information from the time slot processor 65 sends the TS change information, the subscriber station immediately changes the time slot. However, it is also possible to employ a configuration in which the time slot processor sends to the subscriber station reservation information indicating the timing for changing the time slot and the subscriber station determines the time slot change timing in accordance with the reservation information.

Figure 11:
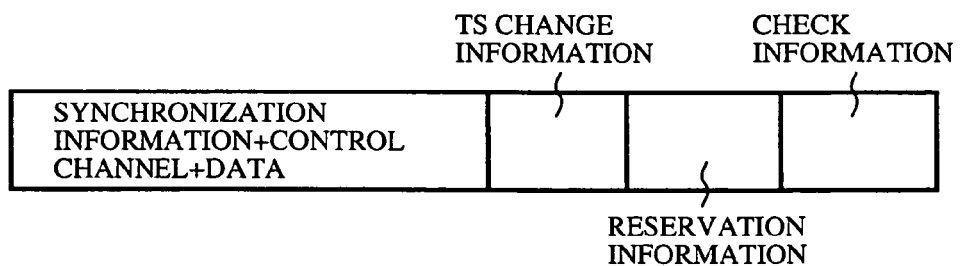
FIG. 11 is a diagram showing a time slot structure in a frame.

That is, at the time of adding the TS change information to the ATM information, the time slot processor 65 adds the ATM information with the reservation information indicating the timing for changing the time slot (for example, when "–5" is added as the reservation information, the time slot is changed after five frames) as shown in FIG. 11.

Upon receiving the ATM information added with the TS change information and the reservation information, the subscriber station changes the time slot in accordance with the TS change information as in Embodiment 1 described above, but it does not necessarily change the time slot immediately after receiving the TS change information but instead determines the timing for changing the time slot in accordance with the reservation information.

For example, when "–5" is added as the reservation information, the subscriber station uses the new time slot after the lapse of five frame periods.

Incidentally, it is also possible to employ a configuration in which the subscriber station count reservation information up by one ("–5"→"–4"→"–3"→"–2"→"–1"→"0") upon each sending of the ATM information from the time slot processor 65 and changes the time slot when the reservation information reaches "0." Alternatively, the time slot processor 65 sends the reservation information once and the subscriber station counts the number of times it receives frames after the reception of the reservation information, thereby obtaining the timing for changing the time slot.

As will be seen from the above, according to Embodiment 3, since the TS change information is sent to the subscriber station together with the reservation information indicating the timing for changing the time slot, the time slot changing process can be prepared in anticipation of a variation in the amount of data to be sent. Accordingly, the time slot can be changed in good time, making it possible to judge the state of congestion in the frequency band used. Moreover, since time slots with no ATM information can also be reserved in the previous frame (it can also be set that, for example, reservation information "2" means that no information will be contained in the time slots for the subsequent two frames), equivalent noise can be reduced when the time division CDMA system is adopted.

Embodiment 4

A description will be given of a fourth embodiment (Embodiment 4) of the present invention.

In Embodiment 3 described above, the subscriber station determines the time slot change timing based on the reservation information sent thereto, but since in this instance the time slot is actually changed several frames after the sending of the TS change information, another subscriber station may sometimes use the time slot concerned, making it impossible to use the desired time slot.

Figure 12:
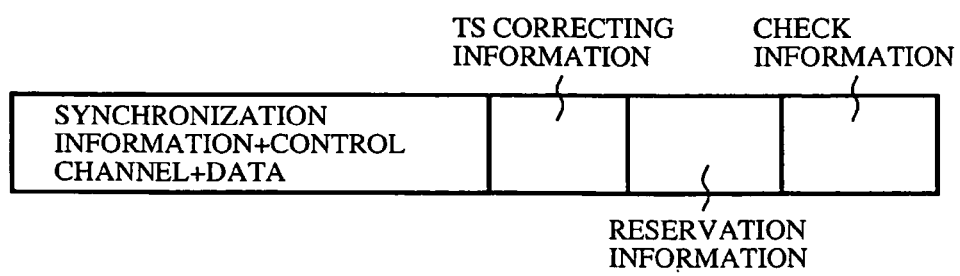
FIG. 12 is a diagram showing a time slot structure in a frame.

To avoid this, according to Embodiment 4, when the desired time slot becomes unusable before the time slot changing means of the subscriber station changes the time slot, the time slot processor 65 sends TS correcting information designating another time slot to the subscriber station as shown in FIG. 12.

In this way, the time slot changing means of the subscriber station changes the time slot based on the TS correcting information; accordingly, even if the desired time slot becomes unusable, it is possible to secure the required transmission rate.

Embodiment 5

A description will be given of a fifth embodiment (Embodiment 5) of the present invention.

In Embodiment 4 described above, the subscriber station determines the time slot change timing based on the reservation information sent thereto, it is also possible to reserve a change of the time slot provisionally assigned to each channel.

That is, when the time slot processor 65 sends reservation information to the subscriber station, the time slot is changed after several frames and the stored contents of the provisional channel memory 67 are reflected on the actual channel memory 66, However, to cope with variations in the amount of data to be sent after several frames, it is also possible to accept a reservation that updates the stored contents of the provisional channel memory 67.

For example, a reservation is made which provisionally assigns #32-2A to the downlink of the second channel of the subscriber station MS11 after several frames.

Accordingly, it is possible to prepare changing the time slot provisionally assigned to each channel.

Embodiment 6

A description will be given of a sixth embodiment (Embodiment 6) of the present invention.

In Embodiments 1 through 5 described above, upon receiving the TS change information sent from the time slot processor, the subscriber station changes the time slot based on the TS change information, but unconditional change of the time slot entails the risk of cutting the radio connection.

To avoid this, according to Embodiment 6, the change of the time slot is allowed as long as the state of current radio communication meets predetermined conditions.

Figure 13:
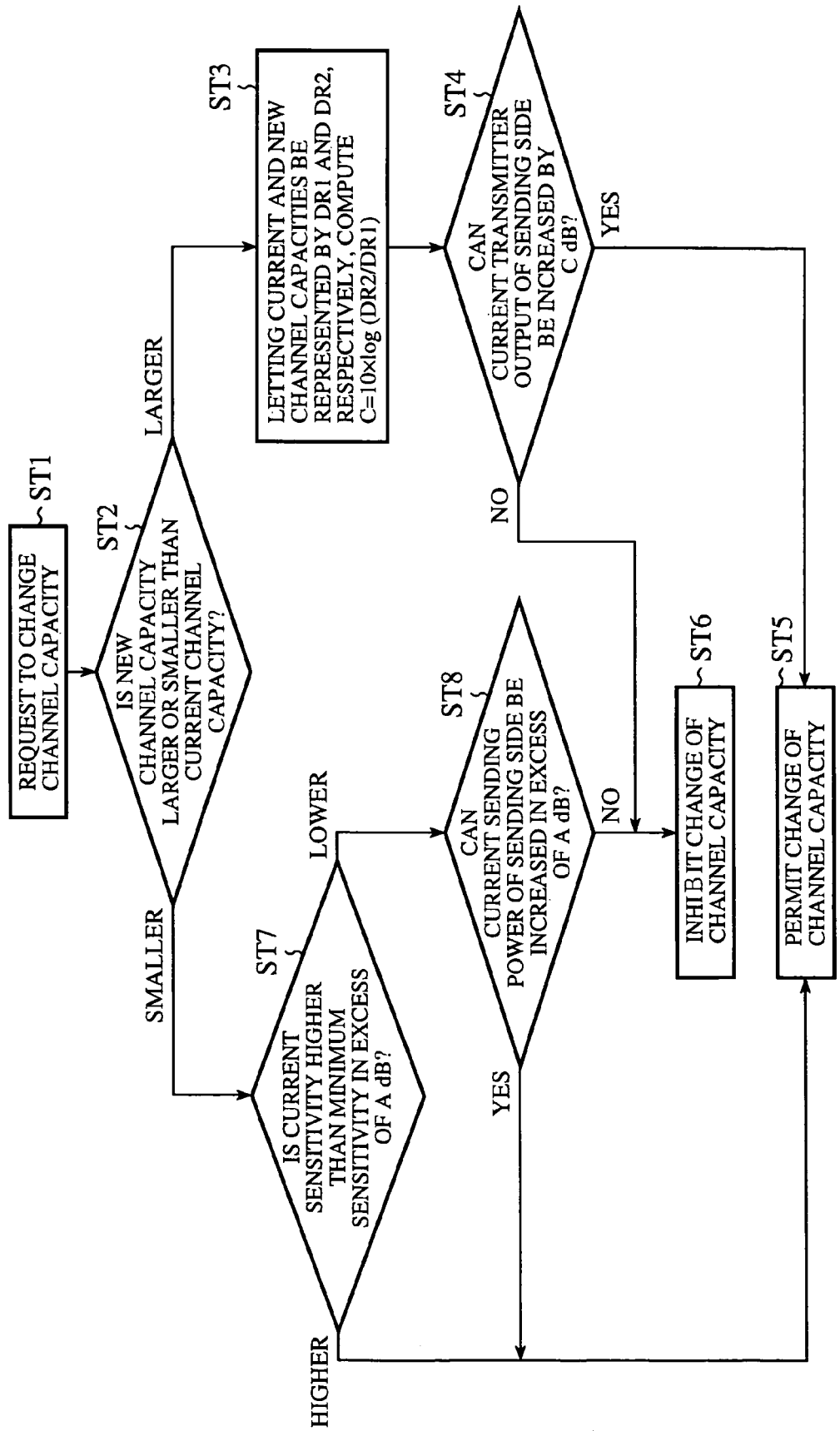
FIG. 13 is a flowchart showing the operation of a mobile communication system according to a sixth embodiment of the present invention.

Concretely, as depicted in FIG. 13, when a request for a change of the channel capacity is made (step ST1), the time slot processor 65 judges whether the new channel capacity is larger than the channel capacity currently used for communication (step ST2).

When the new channel capacity is larger than the channel capacity currently used for communication, an amount of increase in the sending power caused by an increase in the channel capacity is computed from the current transmission rate DR1 and the new transmission rate DR2 (step ST3).

$$C(dB) = 10 \times \log(DR2/DR1)$$

Upon counting the amount of increase C in the sending power, the time slot processor 65 judges whether the transmitter of the base station can increase the current sending power by C (dB) (step ST4).

When the transmitter of the base station can increase the current sending power by C (dB), an increase in the channel capacity will be unlikely to cause cutting the radio connection. Accordingly, the time slot processor 65 permits the change of the channel capacity (step ST5) and sends the TS change information to the subscriber station in the same manner as described above with reference to Embodiments 1 to 5.

On the other hand, when the transmitter of the base station cannot increase the current sending power by C (dB), an increase in the channel capacity will be likely to cause cutting the radio connection, and hence the time slot processor does not permit the change of the channel capacity (step ST6) and stops sending the TS change information. In the case where the sending power of the transmitter of the base station can be increased to some extent, it is possible to set the channel capacity corresponding to the amount of increase and send the TS change information accordingly.

When the new channel capacity is smaller than the current channel capacity, the time slot processor 65 compares the sensitivity of the receiver of the subscriber station and its minimum sensitivity and judges whether the sensitivity of the receiver of the subscriber station is higher than the minimum sensitivity in excess of A dB (sep ST7).

That is, when the sensitivity of the receiver of the subscriber station is higher than the minimum sensitivity in excess A dB, a change of the time slot will be unlikely to cause cutting the radio connection, and hence the time slot processor permits a change of the channel capacity and sends the TS change information to the subscriber station.

On the other hand, when the sensitivity of the receiver of the subscriber station is so low as to be much the same as the minimum sensitivity and is not higher than the latter in excess of A dB, a change of the time slot will be likely to cause cutting the radio connection, and hence the time slot processor judges whether the current sending power of the transmitter of the base station can be increase by A (dB) (step ST8).

That is, even if the sensitivity of the receiver is low, an increase in the sending power of the transmitter reduces the possibility of the radio connecting being cut even if the time slot is changed; hence, the time slot processor judges whether the current sending power of the transmitter of the base station can be increased by A (dB).

When the current sending power of the transmitter of the base station can be increased by A (dB), the time slot processor permits a change of the channel capacity and sends the TS change information to the subscriber station.

When the current sending power of the transmitter of the base station cannot be increased by A (dB), the time slot processor does not permit a change of the channel capacity (step ST6) and stops sending the TS change information.

As will be seen from the above, according to Embodiment 6, when the channel capacity increases, it is determined whether to permit or inhibit the change of the transmission by referring to the sendable power of the transmitter in the base station, and when the channel capacity decreases, it is determined whether to permit or inhibit the change of the transmission rate by referring to the sensitivity of the receiver in the subscriber station and the sendable power of the transmitter in the base station. Hence, this embodiment prevents the radio connection from being cut by a change of the time slot.

Embodiment 7

Figure 14:
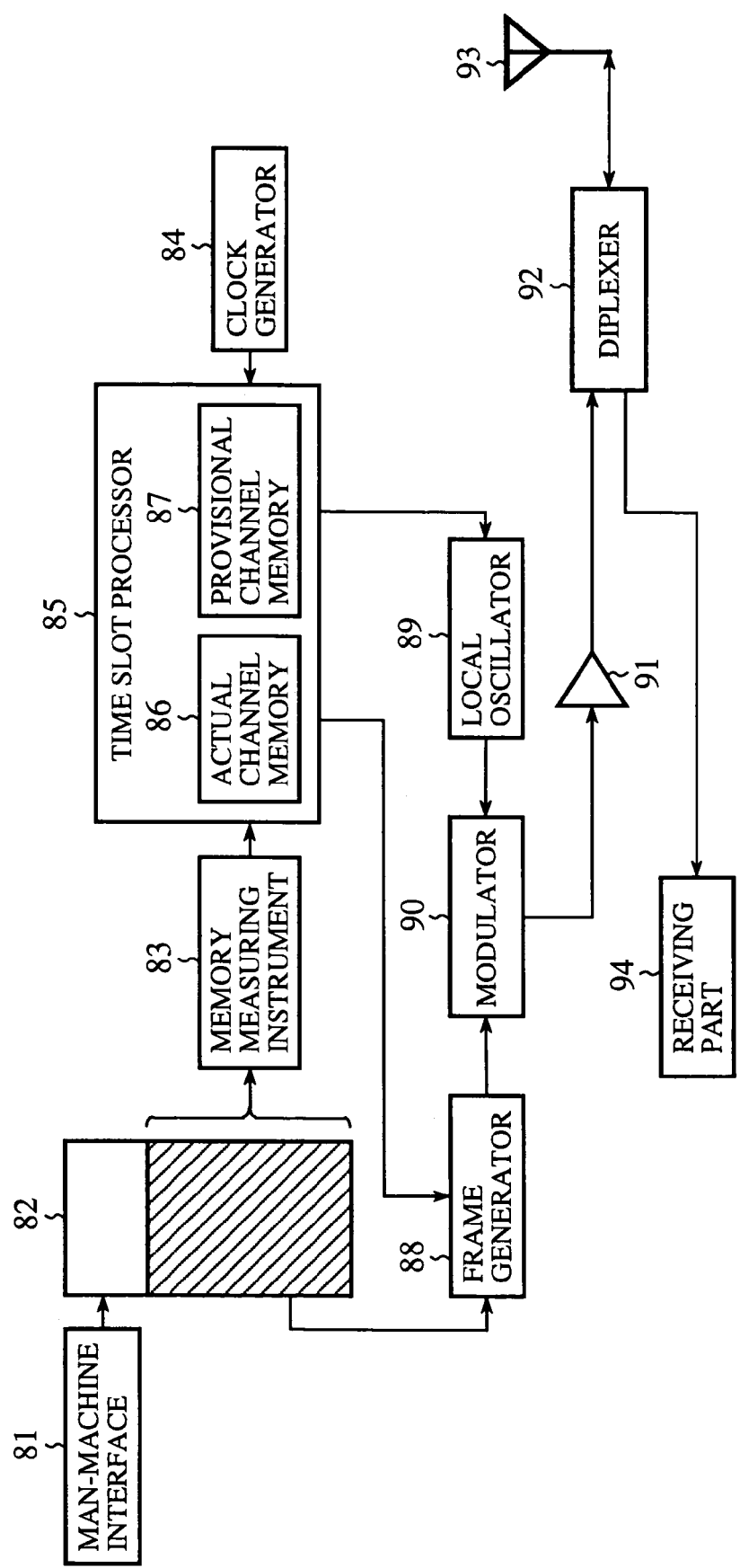
FIG. 14 is a block diagram illustrating the inside (change request means) of a subscriber station of a mobile communication system according to a seventh embodiment of the present invention.

FIG. 14 is a block diagram illustrating the inside (change request means) of the subscriber station in the mobile communication system according to a seventh embodiment (Embodiment 7) of the present invention. Reference numeral 81 denotes a man-machine interface such as a keyboard, image display part, voice input/output part or the like; 82 denotes a FIFO memory for storing data input from the man-machine interface 81; 83 denotes a memory measuring instrument for measuring the amount of information currently remaining in the FIFO memory 82 (the instantaneous amount of data which has yet to be sent to the subscriber station); and 84 denotes a clock generator for generating a clock.

Reference numeral 85 denotes a time slot processor which performs a selection process of selecting a time slot to be used for the transmission of the next frame in accordance with the amount of data remaining in the memory measured by the memory measuring instrument 83; 86 denotes an actual channel memory which stores a channel currently in use; 87 denotes a provisional channel memory provisionally pre-assigned a time slot to be used for the transmission of the next frame; 88 denotes a frame generator which, under instructions from the time slot processor 85, extracts from the FIFO memory 82 the data to be sent to the subscriber station, and adds the data with TS change information and check information to form a frame which is sent to the subscriber station; 89 denotes a local oscillator which generates a carrier under instructions from the time slot processor 85; and 90 denotes a modulator by which the frame generated by the frame generator 88 is modulated to the carrier generated by the local oscillator 89.

Reference numeral 91 denotes an amplifier for amplifying the carrier which is output from the modulator 90; 92 denotes a diplexer; 93 denotes an antenna; and 94 denotes a receiving part.

Next, the operation of this embodiment will be described below.

While in Embodiments 1 to 6 the base station instructs the subscriber station to change the time slot, the subscriber station may also be designed to change the time slot independently by incorporating in the subscriber station the same change request means as that of the base station depicted in FIG. 7.

That is, the time slot processor 85 of the subscriber station determines the time slot for the transmission of the next frame (or for the transmission after several frames) in accordance with the amount of data remaining in the memory measured by the memory measuring instrument 83, and sends to the base station a frame in which TS change information and reservation information are added to transmission data.

Since this embodiment is identical with Embodiments 1 to 6 except that the subscriber station determines the transmission rate in place of the base station, no detailed description will be given of this embodiment.

Figure 15:
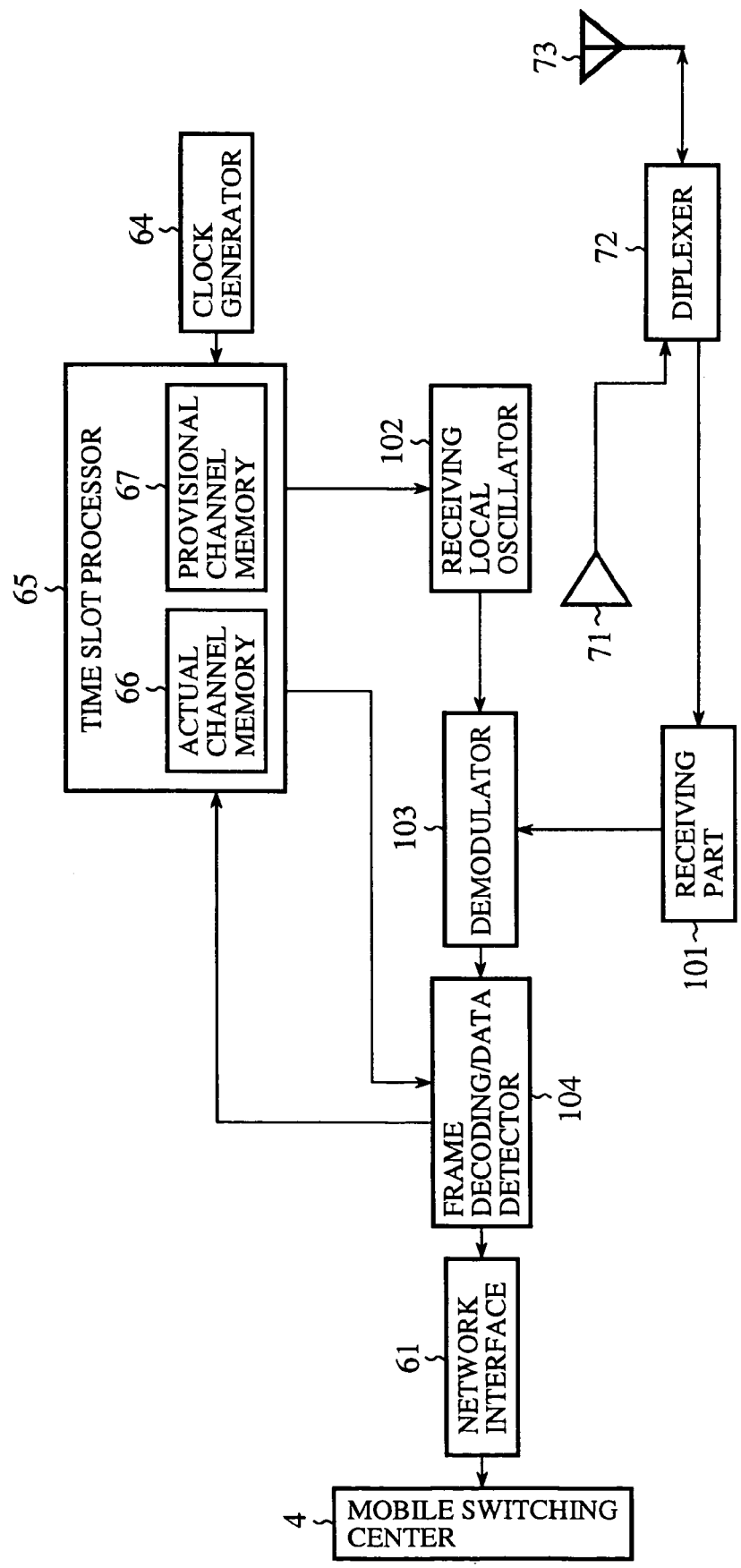
FIG. 15 is a block diagram depicting time slot changing means of the base station which receives TS change information from the subscriber station and changes the time slot accordingly.

Incidentally, FIG. 15 is a block diagram illustrating time slot changing means of the base station which receives the TS change information from the subscriber station and changes the time slot (the time slot changing means of the subscriber station being also substantially identical in construction therewith). Reference numeral 101 denotes a receiving part for receiving the frame added with the TS change information; 102 denotes a receiving local oscillator; 103 denotes a demodulator for demodulating the frame received by the receiving part 101; and 104 denotes a frame decoding/data detector which decodes the frame demodulated by the demodulator 103 and, when detecting the TS change information, outputs the TS change information to the time slot processor 65.

Upon receiving the TS change information from the frame decoding/data detector 104, the time slot processor 65 changes the time slot for reception of the next frame in accordance with the TS change information.

EFFECT OF THE INVENTION

As described above, the mobile communication system according to the present invention has a communication channel in which uplink and downlink channel capacities differ from each other, and is suitable for use with such transmission systems as a time division multiple access (TDMA) system, a code division multiple access/time division duplex (CDMA/TDD) system, and a time division CDMA (Time Divided CDMA) system.

It will be apparent that many modifications and variations may be effected without departing from the scope of the novel concepts of the present invention.

What is claimed is:

1. A mobile communication system, comprising:
    at least one base station, including time slot change request means which sends time slot change information to a subscriber station connected thereto by radio when it becomes necessary to change the transmission rate for data to be sent to the subscriber station; and
    at least one subscriber station, including time slot changing means which, upon receiving the time slot change information from the change request means of the base station, changes the time slot in which to receive data from the base station in accordance with the time slot change information.

2. The mobile communication system of claim 1, wherein when having sent the time slot change information to the subscriber station, the change request means of the base station begins to use the new time slot to send data contained in the next frame.

3. The mobile communication system of claim 1, wherein the change request means of the base station determines the transmission rate in accordance with an instantaneous amount of data sent to the subscriber station.

4. The mobile communication system of claim 3, wherein the change request means of the base station detects the instantaneous amount of data from that amount of data received from a switching center which has yet to be sent to the subscriber station.

5. The mobile communication system of claim 1, wherein at the time of sending the time slot change information to the subscriber station, the change request means of the base station obtains the time slot change information from a provisional channel memory provisionally pre-assigned the time slot to be used for the transmission of the next frame.

6. The mobile communication system of claim 1, wherein at the time of sending the time slot change information to the subscriber station, the change request means of the base station also sends reservation information indicating the time slot change timing to the subscriber station.

7. The mobile communication system of claim 6, wherein the time slot changing means of the subscriber station determines the time slot change timing in accordance with the reservation information sent from the base station.

8. The mobile communication system of claim 6, wherein when a desired time slot becomes unusable before the time slot changing means of the subscriber station performs time slot switching after sending the time slot change information and the reservation information to the subscriber station, the change request means of the base station sends time slot change information indicating another time slot to the subscriber station.

9. The mobile communication system of claim 1, wherein in the case of increasing the data transmission rate, the change request means of the base station determines whether to change the transmission rate by referring to the sendable power of a transmitter in the base station.

10. The mobile communication system of claim 1, wherein in the case of decreasing the data transmission rate, the change request means of the base station determines whether to change the transmission rate by referring to the sensitivity of a receiver in the subscriber station and the transmission power of a transmitter in the base station.

11. A mobile communication system comprising:
    at least one subscriber station, including time slot change request means which sends a time slot change information to a base station connected thereto by radio when it becomes necessary to change the transmission rate for data to be sent to the base station; and
    at least one base station, including time slot changing means which, upon receiving the time slot change information from the change request means of the subscriber station, changes the time slot in which to receive data from the subscriber station in accordance with the time slot change information.

12. The mobile communication system of claim 11, wherein when having sent the time slot change information to the base station, the change request means of the subscriber station begins to use the new time slot to send data contained in the next frame.

13. The mobile communication system of claim 11, wherein the change request means of the subscriber station determines the transmission rate in accordance with an instantaneous amount of data to be sent to the base station.

14. The mobile communication system of claim 13, wherein the change request means of the subscriber station detects the instantaneous amount of data from that amount of data received from a man-machine interface which has yet to be sent to the subscriber station.

15. The mobile communication system of claim 11, wherein at the time of sending the time slot change information to the base station, the change request means of the subscriber station obtains said time slot change information from a provisional channel memory provisionally pre-assigned the time slot to be used for the transmission of the next frame.

16. The mobile communication system of claim 11, wherein at the time of sending the time slot change information to the base station, the change request means of the subscriber station also sends reservation information indicating the time slot change timing to the base station.

17. The mobile communication system of claim 16, wherein the time slot changing means of the base station determines the time slot change timing in accordance with the reservation information sent from the subscriber station.

18. The mobile communication system of claim 16, wherein when a desired time slot becomes unusable before the time slot changing means of the base station performs time slot switching after sending the time slot change information and the reservation information to the base station, the change request means of the subscriber station sends time slot change information indicating another time slot to the base station.

19. The mobile communication system of claim 11, wherein in the case of increasing the data transmission rate, the change request means of the subscriber station determines whether to change the transmission rate by referring to the sendable power of a transmitter in the subscriber station.

20. The mobile communication system of claim 11, wherein in the case of decreasing the data transmission rate, the change request means of the subscriber station determines whether to change the transmission rate by referring to the sensitivity of a receiver in the base station and the transmission power of a transmitter in the subscriber station.

21. A mobile communication system, comprising:
at least one base station, including time slot change request means for sending time slot change information to a subscriber station connected to the base station by a radio communication channel, when it becomes necessary to change a transmission rate for data to be sent from said base station to said subscriber station, and time slot changing means for receiving time slot change information from a subscriber station and changing a time slot in which to receive data from said subscriber station; and
at least one subscriber station, including time slot change request means for sending time slot change information to a base station connected to the subscriber station by a radio communication channel, when it becomes necessary to change transmission rate for data to be sent from said at least one subscriber station to said base station; and time slot changing means for receiving time slot change information from a base station and changing a time slot in which to receive data from said base station.

\* \* \* \* \*